United States Patent
Oh et al.

(10) Patent No.: US 10,182,239 B2
(45) Date of Patent: *Jan. 15, 2019

(54) APPARATUS FOR DECODING VIDEO DATA

(71) Applicant: INFOBRIDGE PTE. LTD., Singapore (SG)

(72) Inventors: Soo Mi Oh, Seongnam-si (KR); Moonock Yang, Singapore (SG)

(73) Assignee: INFOBRIDGE PTE. LTD., Singapore (SG)

( * ) Notice: Subject to any disclaimer, the term of this patent is extended or adjusted under 35 U.S.C. 154(b) by 68 days.

This patent is subject to a terminal disclaimer.

(21) Appl. No.: 15/360,375

(22) Filed: Nov. 23, 2016

(65) Prior Publication Data

US 2017/0078693 A1 Mar. 16, 2017

Related U.S. Application Data

(63) Continuation of application No. 14/350,008, filed as application No. PCT/CN2012/084159 on Nov. 6, 2012, now Pat. No. 9,532,049.

(30) Foreign Application Priority Data

Nov. 7, 2011 (KR) .................. 10-2011-0115216

(51) Int. Cl.
*H04N 19/52* (2014.01)
*H04N 19/176* (2014.01)
(Continued)

(52) U.S. Cl.
CPC ........... *H04N 19/52* (2014.11); *H04N 19/124* (2014.11); *H04N 19/159* (2014.11);
(Continued)

(58) Field of Classification Search
None
See application file for complete search history.

(56) References Cited

U.S. PATENT DOCUMENTS

2004/0223657 A1* 11/2004 Sugimoto ............... G06T 9/001
382/243
2005/0053143 A1 3/2005 Holcomb et al.
(Continued)

FOREIGN PATENT DOCUMENTS

CN 1984340 A 6/2007
CN 101411195 A 4/2009
(Continued)

OTHER PUBLICATIONS

Hirofumi Aoki et al., "CE4 Subtest 2: Spatial QP prediction: combination of test 2.3.g, 2.3.f and 2.3.e", Joint Collaborative Team on Video Coding (JCT-VC) of ITU-T SG16 WP3 and ISO/IEC JTC1/SC29/WG11 6th Meeting, Jul. 14-22, 2011, JCTVC-F661, 10 pages.

(Continued)

*Primary Examiner* — Mohammed S Rahaman
(74) *Attorney, Agent, or Firm* — Birch, Stewart, Kolasch & Birch, LLP

(57) ABSTRACT

An apparatus is provided for decoding video data in a merge mode. The apparatus comprises an inter prediction unit configured to derive motion information of a current coding unit and generate a prediction block using the motion information, wherein the motion information is derived using a merge index and a merge candidate list constructed using available spatial and temporal merge candidates. The apparatus further comprises an inverse-quantizing unit configured to inverse-quantize a quantized block by using a quantization parameter, an inverse transform unit configured to generate a residual block by inverse-transforming the (Continued)

inverse-quantized block, and an adder configured to generate a reconstruct block by adding the residual block and the prediction block.

6 Claims, 10 Drawing Sheets

(51) Int. Cl.
*H04N 19/463* (2014.01)
*H04N 19/124* (2014.01)
*H04N 19/513* (2014.01)
*H04N 19/159* (2014.01)

(52) U.S. Cl.
CPC ......... *H04N 19/176* (2014.11); *H04N 19/463* (2014.11); *H04N 19/513* (2014.11)

(56) References Cited

U.S. PATENT DOCUMENTS

| | | |
|---|---|---|
| 2007/0098067 A1 | 5/2007 | Kim et al. |
| 2011/0274162 A1 | 11/2011 | Zhou et al. |
| 2011/0293010 A1 | 12/2011 | Jeong et al. |
| 2012/0134416 A1* | 5/2012 | Lin .................. H04N 19/52 375/240.16 |
| 2012/0140832 A1 | 6/2012 | Sjoberg et al. |
| 2012/0170648 A1* | 7/2012 | Chen .................. H04N 19/70 375/240.03 |
| 2012/0230411 A1 | 9/2012 | Liu et al. |
| 2012/0263231 A1* | 10/2012 | Zhou .................. H04N 19/52 375/240.12 |
| 2012/0263235 A1* | 10/2012 | Sugio .................. H04N 19/513 375/240.16 |
| 2013/0003857 A1 | 1/2013 | Yu et al. |
| 2013/0077871 A1* | 3/2013 | Lu .......................... G06K 9/36 382/197 |
| 2014/0226725 A1 | 8/2014 | Lin et al. |

FOREIGN PATENT DOCUMENTS

| | | |
|---|---|---|
| CN | 101917615 A | 12/2010 |
| CN | 102055985 A | 5/2011 |
| KR | 10-2011-0090841 A | 8/2011 |
| WO | WO 2009/105732 A1 | 8/2009 |
| WO | WO 2011/110039 A1 | 9/2011 |

OTHER PUBLICATIONS

International Search Report for PCT/CN2012/084159 filed on Nov. 6, 2012.
Kenji Kondo et al., "Improvement of delta-QP Coding", Joint Collaborative Team on Video Coding (JCT-VC) of ITU-T-SG16 WP3 and ISO/IEC JTC1/SC29/WG11 6th Meeting, Jul. 14-22, 2011, JCTVC-F422r, 8 pages.
Masaaki Kobayashi et al., "CE4 Subtest 2: Delta QP prediction results of test 2.2.b and 2.3.f", JCTVC-F300, Jul. 14-22, 2011, pp. 1-8.
Minhua Zhou, "Evaluation results on merge mode in HM2.0", JCTVC-E0015, Mar. 16-23, 2011, pp. 1-8.
Yunfei Zheng et al., "CE9: Unified Merge and AMVP candidates selection (UNI03)", Joint Collaborative Team on Video Coding (JCT-VC) of ITU-T SG16 WP3 and ISE/IEC JTC1/SC29/WG11 6th Meeting, Jul. 14-22, 2011, JCTVC-F297, 11 pages.

* cited by examiner

APPARATUS FOR DECODING VIDEO DATA

CROSS-REFERENCE TO RELATED APPLICATIONS

This application is a continuation of U.S. application Ser. No. 14/350,008 filed on Apr. 4, 2014, which is the National Phase of International Application No. PCT/CN2012/084159 filed on Nov. 6, 2012, which claims the benefit to Korean Application No. 10-2011-0115216 filed in the Republic of Korea on Nov. 7, 2011. The contents of all of these applications are hereby incorporated by reference as fully set forth herein in their entirety.

BACKGROUND OF THE INVENTION

In H.264/MPEG-4 AVC, one picture is divided into a plurality of macroblocks, and each macroblock is encoded by generating a prediction block using inter prediction or intra prediction. A residual block between an original block and the prediction block is transformed to generate a transformed block, and the transformed block is quantized using a quantization parameter and a predetermined quantization matrix. The quantized coefficients of the quantized block are scanned using a scan pattern and then entropy-coded. The quantization parameter is adjusted per macroblock and encoded predictively using a previous quantization parameter.

In inter prediction mode, motion estimation is used to eliminate temporal redundancy between consecutive pictures. To detect the temporal redundancy, one or more reference pictures are searched to estimate motion of a current block, and motion compensation is performed to generate a prediction block using motion information. A block very similar to an original block is searched in a predetermine range of the reference picture. If the block similar to an original block is searched, a residual block between the original block and the searched block and motion information are encoded and transmitted to a decoding side.

The motion information includes at least one reference picture index and at least one motion vector. The motion vector is coded predictively. That is, a motion vector predictor is generated using motion vectors of neighboring block, and the difference between the motion vector and the motion vector predictor is encoded to reduce the amount of coding bits required to encode the motion vector. In H.264, a median of a left motion vector, an above motion vector and an above left motion vector is used as the motion vector predictor.

However, if a motion of the current block is different from motions of the neighboring blocks, the coding efficiency of the motion vector according to the H.264 degrades. Also, when the motion information is the same as one of the neighboring block, the motion vector predictor of H.264 degrades the coding efficiency.

Furthermore, if the various sizes of coding unit are used for inter prediction, adjusting quantization parameter per coding unit results in increase of coding bits required to encode the quantization parameter, and the correlation between the quantization parameter and the previous quantization parameter becomes weaker than that of H.264.

SUMMARY OF THE INVENTION

The present invention relates to a method and apparatus for decoding video data, and more particularly, to a method and apparatus for deriving motion information in merge mode, generating a prediction block and residual block to obtain a reconstructed block.

One aspect of the present invention provides a method of decoding video data in a merge mode, comprising: constructing a merge candidate list by using available spatial merge candidates and a temporal merge candidate, deriving motion information by using a merge index and the merge candidate list, generating a prediction block by using the motion information, generating a residual block by inverse-quantizing the quantized block by using a quantization parameter and a quantization matrix and by inverse-transforming the inverse quantized block, and generating a reconstructed block by using the residual block and the prediction block.

A method according to the present invention constructs a merge candidate list by using available spatial merge candidates and a temporal merge candidate, derives motion information by using a merge index and the merge candidate list, generates a prediction block by using the motion information, generates a residual block by inverse-quantizing the quantized block by using a quantization parameter and a quantization matrix and by inverse-transforming the inverse quantized block, and generates a reconstructed block by using the residual block and the prediction block. The quantization parameter is generated per quantization unit and a minimum size of the quantization unit is adjusted per picture. Therefore, the coding efficiency of motion information by selecting predictor of motion information one among neighboring blocks and a temporal block. Also, the coding efficiency of residual block is improved by adaptively adjusting a quantization parameter per a quantization unit and generating a quantization parameter predictor using multiple neighboring quantization parameters.

DETAILED DESCRIPTION OF THE INVENTION

Hereinafter, various embodiments of the present invention will be described in detail with reference to the accompanying drawings. However, the present invention is not limited to the exemplary embodiments disclosed below, but can be implemented in various types. Therefore, many other modifications and variations of the present invention are possible, and it is to be understood that within the scope of the disclosed concept, the present invention may be practiced otherwise than as has been specifically described.

An image encoding apparatus and an image decoding apparatus according to the present invention may be a user terminal such as a personal computer, a personal mobile terminal, a mobile multimedia player, a smartphone or a wireless communication terminal. The image encoding device and the image decoding device may be include a communication unit for communicating with various devices, a memory for storing various programs and data used to encode or decode images.

Figure 1:
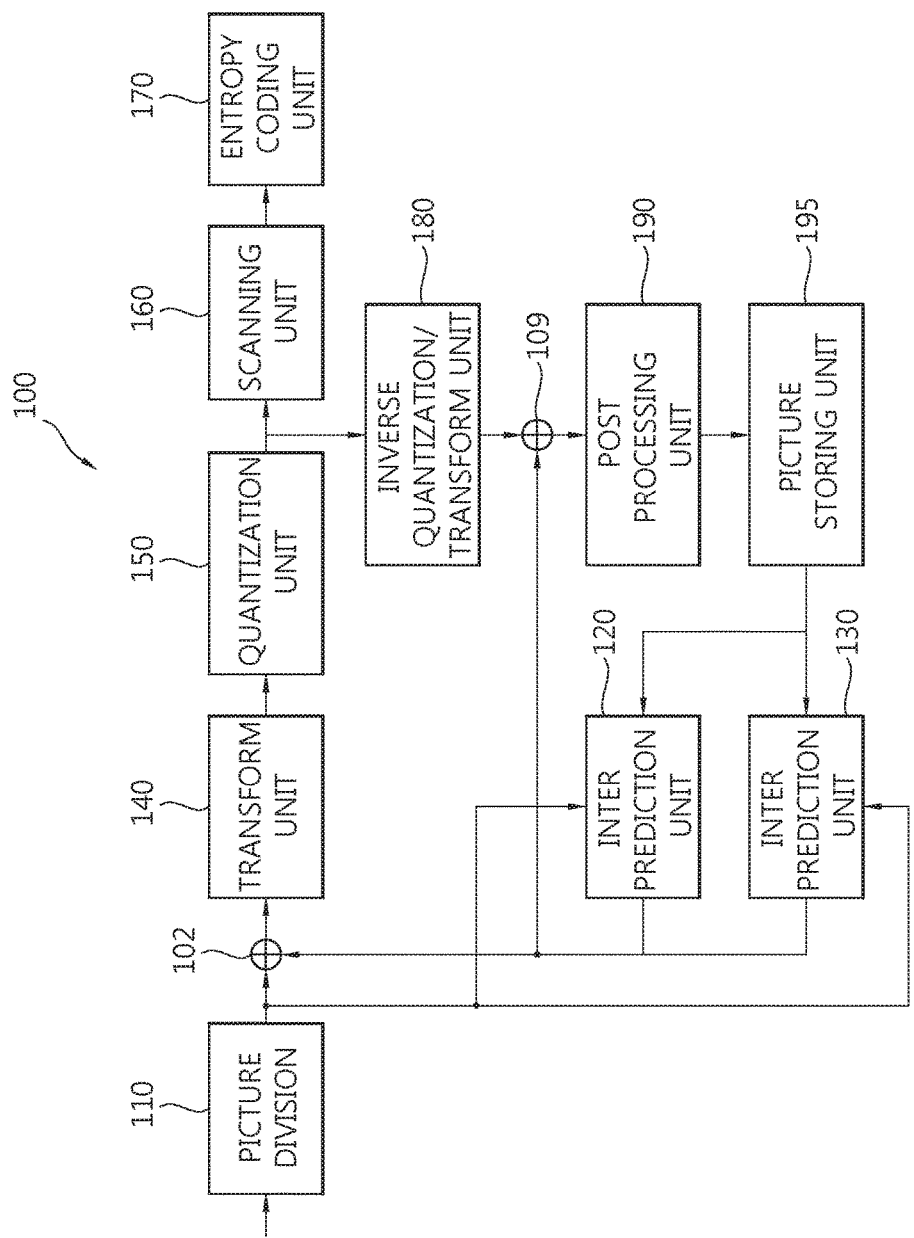
FIG. 1 is a block diagram of an image coding apparatus according to an embodiment of the present invention.

FIG. 1 is a block diagram of an image coding apparatus 100 according to the present invention.

Referring to FIG. 1, the image coding apparatus 100 according to the present invention includes a picture division unit 110, an intra prediction unit 120, an inter prediction unit 130, a transform unit 140, a quantization unit 150, a scanning unit 160, an entropy coding unit 170, an inverse quantization/transform unit 180, a post-processing unit 190 and a picture storing unit 195.

The picture division unit 110 divides a picture or a slice into a plurality of largest coding units (LCUs), and divides each LCU into one or more coding units. The size of LCU may be 32×32, 64×64 or 128×128. The picture division unit 110 determines prediction mode and partitioning mode of each coding unit.

An LCU includes one or more coding units. The LCU has a recursive quad tree structure to specify a division structure of the LCU. Parameters for specifying the maximum size and the minimum size of the coding unit are included in a sequence parameter set. The division structure is specified by one or more split coding unit flags (split_cu_flags). The size of a coding unit is 2N×2N. If the size of the LCU is 64×64 and the size of a smallest coding unit (SCU) is 8×8, the size of the coding unit may be 64×64, 32×32, 16×16 or 8×8.

A coding unit includes one or more prediction units. In intra prediction, the size of the prediction unit is 2N×2N or N×N. In inter prediction, the size of the prediction unit is specified by the partitioning mode. The partitioning mode is one of 2N×2N, 2N×N, N×2N and N×N if the coding unit is partitioned symmetrically. The partitioning mode is one of 2N×nU, 2N×nD, nL×2N and nR×2N if the coding unit is partitioned asymmetrically.

A coding unit includes one or more transform units. The transform unit has a recursive quad tree structure to specify a division structure of the coding unit. The division structure is specified by one or more split transform unit flags (split_tu_flags). Parameters for specifying the maximum size and the minimum size of the transform unit are included in the sequence parameter set.

The intra prediction unit 120 determines an intra prediction mode of a current prediction unit and generates one or more prediction blocks using the intra prediction mode.

The inter prediction unit 130 determines motion information of the current prediction unit using one or more reference pictures stored in the picture storing unit 195, and generates a prediction block of the prediction unit. The motion information includes one or more reference picture indexes and one or more motion vectors.

The transform unit 140 transforms a residual block to generate a transformed block. The residual block has the size of the transform unit. If the prediction unit is larger than the transform unit, the residual signals between the current block and the prediction block are partitioned into multiple residual blocks.

The quantization unit 150 determines a quantization parameter for quantizing the transformed block. The quantization parameter means a quantization step size. The quantization parameter is determined per quantization unit. A size of the quantization unit may vary and is equal to one of allowable sizes of the coding unit. If the size of a coding unit is equal to or larger than the minimum size, the coding unit becomes the quantization unit. A plurality of coding units may be included in a quantization unit of the minimum size. The minimum size of the quantization unit is determined per picture and a parameter for specifying the minimum size of the quantization unit is included in a picture parameter set.

The quantization unit 150 generates a quantization parameter predictor and generates a differential quantization parameter by subtracting the quantization parameter predictor from the quantization parameter. The differential quantization parameter is entropy-coded.

The quantization parameter predictor is generated by using quantization parameters of neighboring coding units and a quantization parameter of previous coding unit as follows.

A left quantization parameter, an above quantization parameter and a previous quantization parameter are sequentially retrieved in this order. An average of the first two available quantization parameters retrieved in that order is set as the quantization parameter predictor when two or more quantization parameters are available, and when only one quantization parameter is available, the available quantization parameter is set as the quantization parameter predictor. That is, if the left and above quantization parameters are available, an average of the left and above quantization parameters is set as the quantization parameter predictor. If only one of the left and above quantization parameters is available, an average of the available quantization parameter and the previous quantization parameters is set as the quantization parameter predictor. If both of the left and above quantization parameters are unavailable, the previous quantization parameter is set as the quantization parameter predictor. The average is rounded off.

The differential quantization parameter is converted into bins for the absolute value of the differential quantization parameter and a bin for indicating sign of the differential quantization parameter through a binarization process, and the bins are arithmetically coded. If the absolute value of the differential quantization parameter is 0, the bin for indicating sign may be omitted. Truncated unary is used for binarization of the absolute.

The quantization unit 150 quantizes the transformed block using a quantization matrix and the quantization parameter to generate a quantized block. The quantized block is provided to the inverse quantization/transform unit 180 and the scanning unit 160.

The scanning unit 160 applies a scan pattern to the quantized block. In inter prediction, a diagonal scan is used as the scan pattern if CABAC is used for entropy coding. The coefficients of the quantized block are split into quantized coefficient components. The quantized coefficient components are significant flags, coefficient signs and coefficient levels. The diagonal scan is applied to each of the coefficient components. The significant coefficient indicates whether the corresponding quantized coefficient is zero or not. The coefficient sign indicates a sign of non-zero quantized coefficient, and the coefficient level indicates an absolute value of non-zero quantized coefficient.

When the size of the transform unit is larger than a predetermined size, the quantized block is divided into multiple subsets and the diagonal scan is applied to each subset. Significant flags, coefficient signs and coefficients levels of each subset are scanned respectively according to the diagonal scan. The predetermined size is 4×4. The subset is a 4×4 block containing 16 transform coefficients.

The scan pattern for scanning the subsets is the same as the scan pattern for scanning the coefficient components. The significant flags, the coefficient signs and the coefficients levels of each subset are scanned in the reverse direction. The subsets are also scanned in the reverse direction.

A parameter indicating last non-zero coefficient position is encoded and transmitted to a decoding side. The parameter specifies a position of last non-zero quantized coefficient within the quantized block. A non-zero subset flag is defined for each subset other than the first subset and the last subset and is transmitted to the decoding side. The first subset covers a DC coefficient. The last subset covers the last non-zero coefficient. The non-zero subset flag indicates whether the subset contains non-zero coefficients or not.

The entropy coding unit 170 entropy-codes the scanned coefficient component received from the scanning unit 160, intra prediction information received from the intra prediction unit 120, motion information received from the inter prediction unit 130, and so on.

The inverse quantization/transform unit 180 inversely quantizes the quantized coefficients of the quantized block, and inversely transforms the inverse-quantized block to generate residual block.

The post-processing unit 190 performs a deblocking filtering process for removing blocking artifact generated in a reconstructed picture.

The picture storing unit 195 receives post-processed image from the post-processing unit 190, and stores the image in picture units. A picture may be a frame or a field.

Figure 2:
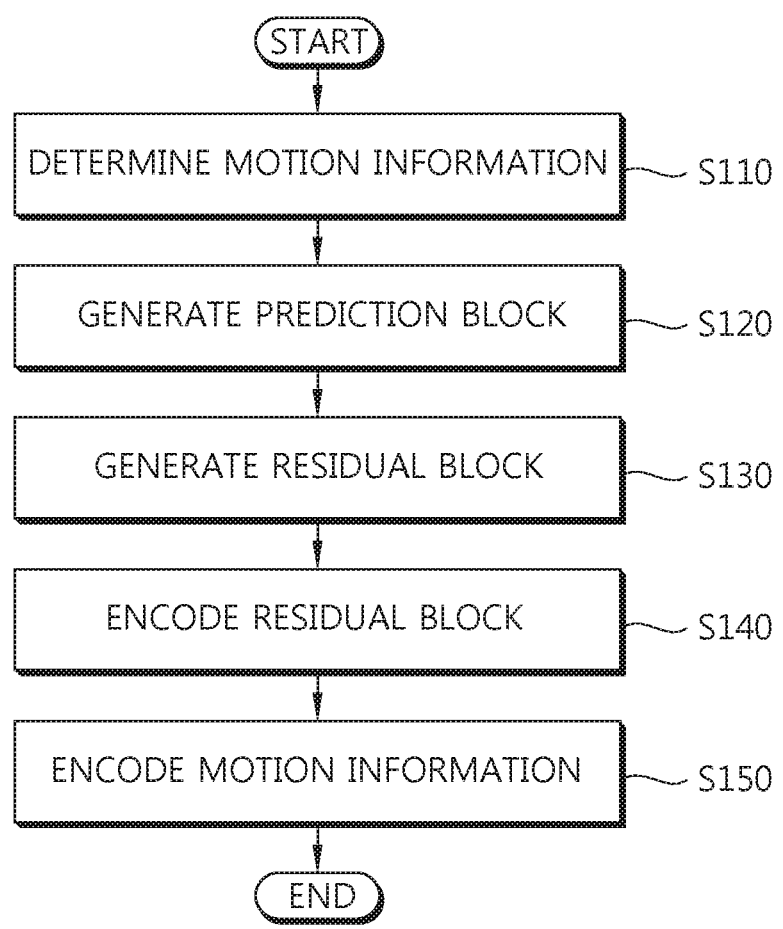
FIG. 2 is a flow chart illustrating a procedure of encoding video data according to an embodiment of the present invention.

FIG. 2 is a flow chart illustrating a procedure of encoding video data according to the present invention.

Motion information of a current block is determined (S110). The current block is a prediction unit. A size of the current block is determined by a size of the coding unit and a partitioning mode.

The motion information varies according to a prediction type. If the prediction type is a uni-directional prediction, the motion information includes a reference index specifying a picture of a reference list 0, and a motion vector. If the prediction type is a bi-directional prediction, the motion information includes two reference indexes specifying a picture of a reference list 0 and a picture of a reference list 1, and a list 0 motion vector and a list 1 motion vector.

A prediction block of the current block is generated using the motion information (S120). If the motion vector indicates a pixel position, the prediction block is generated by copying a block of the reference picture specified by the motion vector. If the motion vector indicates a sub-pixel position, the prediction block is generated by interpolating the pixels of the reference picture.

A residual block is generated using the current block and the prediction block (S130).

The residual block is encoded (S140). The residual block has the same size of the transform unit. If the prediction unit is larger than the transform unit, the residual signals between the current block and the prediction block are divided into multiple residual blocks. The one or more residual blocks are encoded by the transform unit 140, the quantization unit 150, the scanning unit 160 and the entropy coding unit 170 of FIG. 1.

The motion information is encoded (S150). The motion information may be encoded predictively using spatial candidates and a temporal candidate of the current block. The motion information is encoded in a skip mode, a merge mode or an AMVP mode. In the skip mode, the prediction unit has the size of coding unit and the motion information is encoded using the same method as that of the merge mode.

Figure 3:
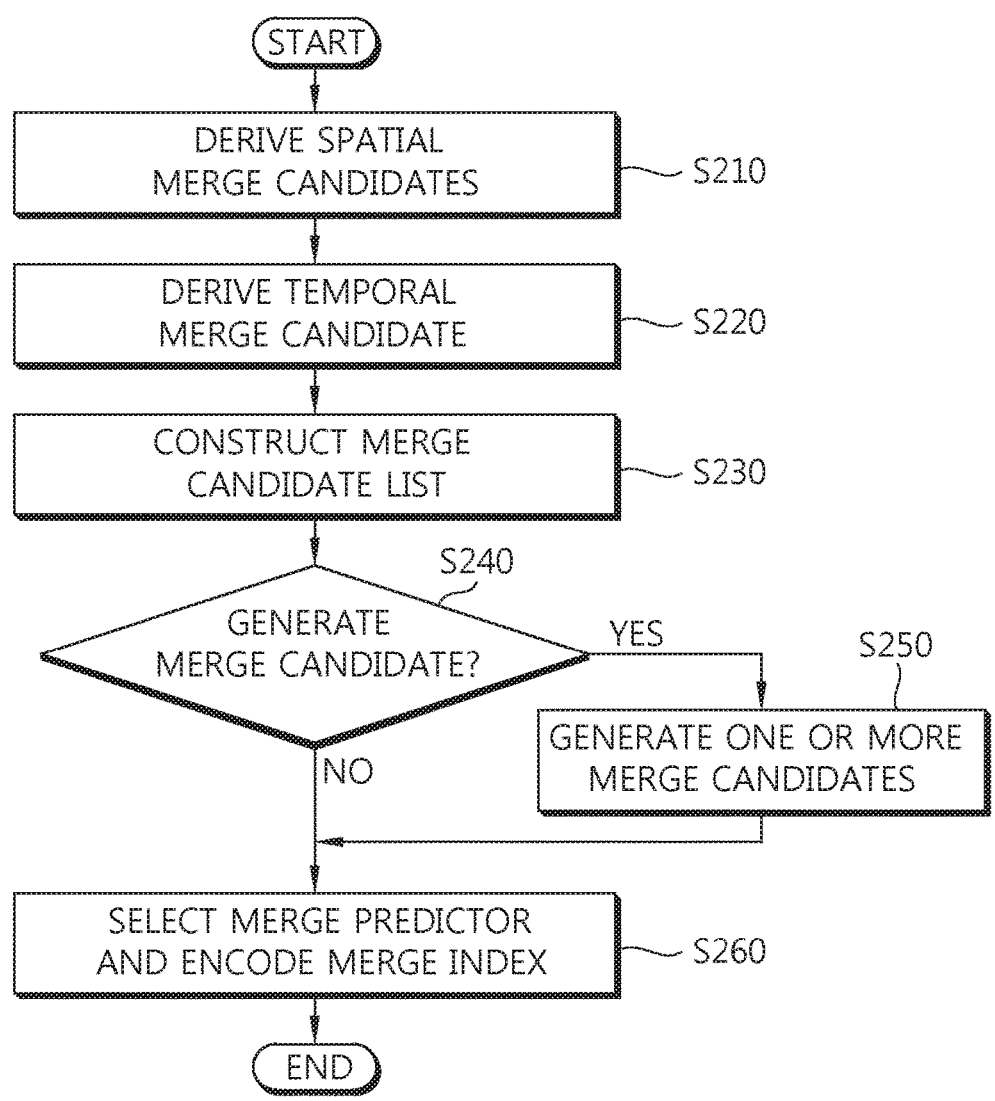
FIG. 3 is a flow chart illustrating a method of encoding motion information in the merge mode according to an embodiment of the present invention.

FIG. 3 is a flow chart illustrating a method of encoding motion information in the merge mode according to the present invention.

Figure 4:
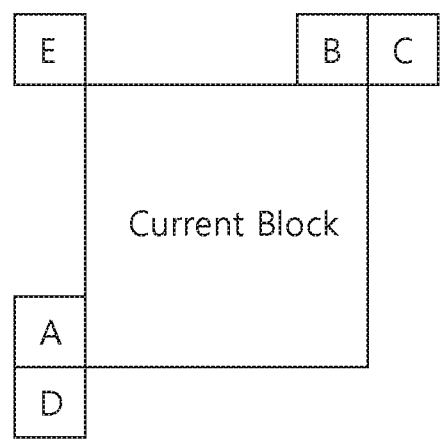
FIG. 4 is a conceptual diagram illustrating positions of spatial merge candidate blocks according to an embodiment of the present invention.

Spatial merge candidates are derived (S210). FIG. 4 is a conceptual diagram illustrating positions of spatial merge candidate blocks according to the present invention.

As shown in FIG. 4, an available left block (block A), an available above block (block B), an available above-right block (block C) and an available left-below block (block D) of the current block are set as merge candidate blocks. If one or more of the blocks A, B, C and D are unavailable, an available above-left block (block E) is set as merge candidate block. The motion information of the merge candidate block is set as spatial merge candidate.

The spatial merge candidate block is set as unavailable if the spatial merge candidate block is intra-coded, does not exist or is located different slice from a current slice.

A temporal merge candidate is derived (S220). The temporal merge candidate includes a reference picture index and a motion vector of the temporal merge candidate.

The reference picture index of the temporal merge candidate may be derived using one or more reference picture indexes of neighboring block. For example, one of the reference picture indexes of a left neighboring block, an above neighboring block and a corner neighboring block is set as the reference picture index of the temporal merge candidate. The corner neighboring block is one of an above-right neighboring block, a left-below neighboring block and an above-left neighboring block. Alternatively, the reference picture index of the temporal merge candidate may be set to zero to reduce the complexity.

The motion vector of the temporal merge candidate may be derived as follows.

First, a temporal merge candidate picture is determined. The temporal merge candidate picture includes a temporal merge candidate block. One temporal merge candidate picture is used within a slice. A reference picture index of the temporal merge candidate picture may be set to zero.

If the current slice is a P slice, one of the reference pictures of the reference picture list 0 is set as the temporal merge candidate picture. If the current slice is a B slice, one of the reference pictures of the reference picture lists 0 and 1 is set as the temporal merge candidate picture. A list indicator specifying whether the temporal merge candidate picture belongs to the reference picture lists 0 or 1 is included in a slice header if the current slice is a B slice. The reference picture index specifying the temporal merge candidate picture may be included in the slice header.

Next, the temporal merge candidate block is determined. The temporal merge candidate block may be a first candidate block or a second candidate block. If the first candidate block is available, the first candidate block is set as the temporal merge candidate block. If the first candidate block is unavailable, the second candidate block is set as the temporal merge candidate block. If the second candidate block is unavailable, the temporal merge candidate block is set as unavailable.

Figure 5:
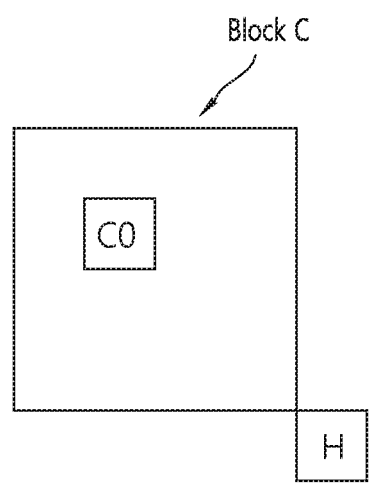
FIG. 5 is a conceptual diagram illustrating position of temporal merge candidate block according to an embodiment of the present invention.

FIG. 5 is a conceptual diagram illustrating position of temporal merge candidate block according to the present invention. As shown in FIG. 5, the first merge candidate block may be a right-below corner block (block H) of the block C. The block C has same size and same location of the current block and is located within the temporal merge candidate picture. The second merge candidate block is a block covering an upper-left pixel of the center of the block C.

If the temporal merge candidate block is determined, the motion vector of the temporal merge candidate block is set as the motion vector of the temporal merge candidate.

A merge candidate list is constructed (S230). The available spatial candidates and the available temporal candidate are listed in a predetermined order. The spatial merge candidates are listed up to four in the order of A, B, C, D and E. The temporal merge candidate may be listed between B and C or after the spatial candidates.

It is determined whether one or more merge candidates are generated or not (S240). The determination is performed by comparing the number of merge candidates listed in the merge candidate list with a predetermined number of the merge candidates. The predetermined number may be determined per picture or slice.

If the number of merge candidates listed in the merge candidate list is smaller than a predetermined number of the merge candidates, one or more merge candidates are generated (S250). The generated merge candidate is listed after the last available merge candidate.

If the number of available merge candidates is equal to or greater than 2, one of two available merge candidates has list 0 motion information and the other has list 1 motion information, the merge candidate may be generated by combining the list 0 motion information and the list 1 motion information. Multiple merge candidates may be generated if there are multiple combinations.

One or more zero merge candidates may be added to the list. If the slice type is P, the zero merge candidate has only list 0 motion information. If the slice type is B, the zero merge candidate has list 0 motion information and list 1 motion information.

A merge predictor is selected among the merge candidates of the merge list, a merge index specifying the merge predictor is encoded (S260).

Figure 6:
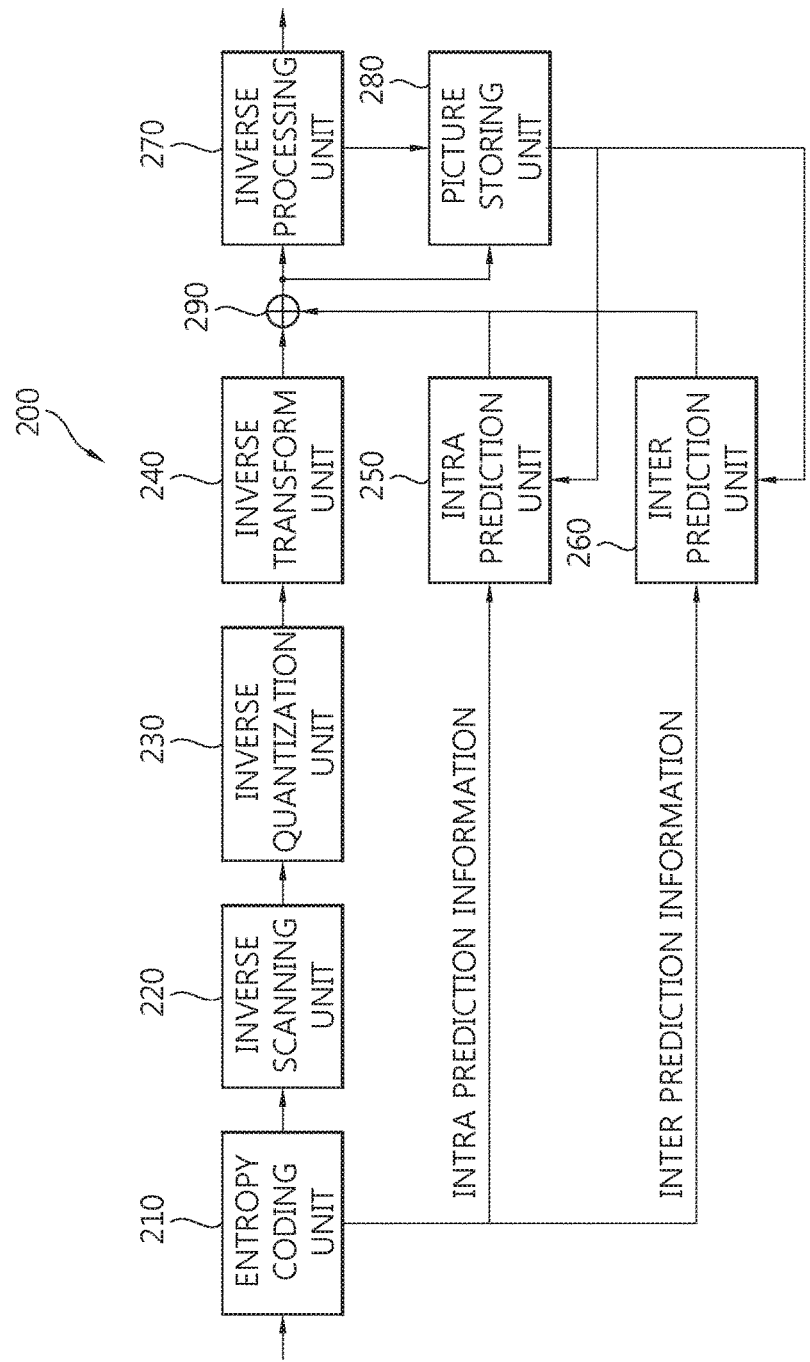
FIG. 6 is a block diagram of an image decoding apparatus according to an embodiment of the present invention.

FIG. 6 is a block diagram of an image decoding apparatus 200 according to the present invention.

The image decoding apparatus 200 according to the present invention includes an entropy decoding unit 210, an inverse scanning unit 220, an inverse quantization unit 230, an inverse transform unit 240, an intra prediction unit 250, an inter prediction unit 260, a post-processing unit 270, a picture storing unit 280 and an adder 290.

The entropy decoding unit 210 extracts the intra prediction information, the inter prediction information and the quantized coefficient components from a received bit stream using a context-adaptive binary arithmetic decoding method.

The inverse scanning unit 220 applies an inverse scan pattern to the quantized coefficient components to generate quantized block. In inter prediction, the inverse scan pattern is a diagonal scan. The quantized coefficient components include the significant flags, the coefficient signs and the coefficients levels.

When the size of the transform unit is larger than the a predetermined size, the significant flags, the coefficient signs and the coefficients levels are inversely scanned in the unit of subset using the diagonal scan to generate subsets, and the subsets are inversely scanned using the diagonal scan to generate the quantized block. The predetermined size is equal to the size of the subset. The subset is a 4×4 block including 16 transform coefficients. The significant flags, the coefficient signs and the coefficient levels are inversely scanned in the reverse direction. The subsets are also inversely scanned in the reverse direction.

A parameter indicating last non-zero coefficient position and the non-zero subset flags are extracted from the bit stream. The number of encoded subsets is determined based on the parameter indicating last non-zero coefficient position. The non-zero subset flag is used to determine whether the corresponding subset has at least one non-zero coefficient. If the non-zero subset flag is equal to 1, the subset is generated using the diagonal scan. The first subset and the last subset are generated using the inverse scan pattern.

The inverse quantization unit 230 receives the differential quantization parameter from the entropy decoding unit 210 and generates the quantization parameter predictor to generate the quantization parameter of the coding unit. The operation of generating the quantization parameter predictor is the same as that of the quantization unit 150 of FIG. 1. Then, the quantization parameter of the current coding unit is generated by adding the differential quantization parameter and the quantization parameter predictor. If the differential quantization parameter is not transmitted from an encoding side, the differential quantization parameter is set to zero.

The inverse quantization unit 230 inversely quantizes the quantized block.

The inverse transform unit 240 inversely transforms the inverse-quantized block to generate a residual block. An inverse transform matrix is adaptively determined according to the prediction mode and the size of the transform unit. The inverse transform matrix is a DCT-based integer transform matrix or a DST-based integer transform matrix. The DCT-based integer transform matrix is used for inter prediction.

The intra prediction unit 250 derives an intra prediction mode of a current prediction unit using intra prediction information, and generates a prediction block according to the derived intra prediction mode.

The inter prediction unit 260 derives motion information of a current prediction unit using inter prediction information, and generates a prediction block using the motion information.

The post-processing unit 270 operates the same as the post-processing unit 180 of FIG. 1.

The picture storing unit 280 receives post-processed image from the post-processing unit 270, and stores the image in picture units. A picture may be a frame or a field.

The adder 290 adds the restored residual block and a prediction block to generate a reconstructed block.

Figure 7:
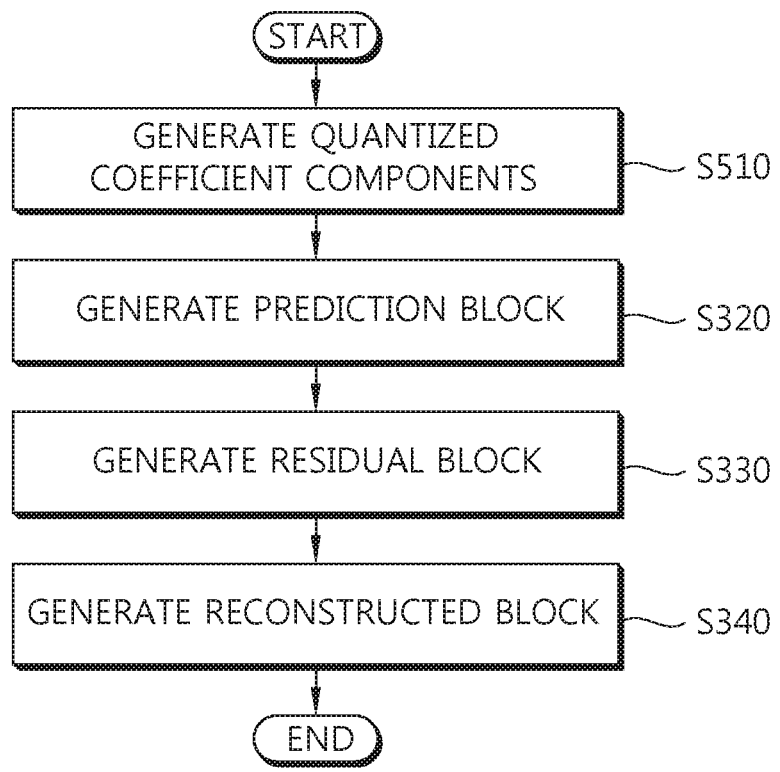
FIG. 7 is a flow chart illustrating a method of decoding an image in inter prediction mode according to an embodiment of the present invention.

FIG. 7 is a flow chart illustrating a method of decoding an image in inter prediction mode according to the present invention.

Motion information of a current block is derived (S310). The current block is a prediction unit. A size of the current block is determined by the size of the coding unit and the partitioning mode.

The motion information varies according to a prediction type. If the prediction type is a uni-directional prediction, the motion information includes a reference index specifying a picture of a reference list 0, and a motion vector. If the prediction type is a bi-directional prediction, the motion information includes a reference index specifying a picture of a reference list 0, a reference index specifying a picture of a reference list 1, and a list 0 motion vector and a list 1 motion vector.

The motion information is adaptively decoded according the coding mode of the motion information. The coding mode of the motion information is determined by a skip flag and a merge flag. If the skip flag is equal to 1, the merge flag does not exist and the coding mode is a skip mode. If the skip flag is equal to 0 and the merge flag is equal to 1, the coding mode is a merge mode. If the skip flag and the merge flag are equal to 0, the coding mode is an AMVP mode.

A prediction block of the current block is generated using the motion information (S320).

If the motion vector indicates a pixel position, the prediction block is generated by copying a block of the reference picture specified by the motion vector. If the motion vector indicates a sub-pixel position, the prediction block is generated by interpolating the pixels of the reference picture.

A residual block is generated (S330). The residual block is generated by the entropy decoding unit 210, the inverse scanning unit 220, the inverse quantization unit 230 and the inverse transform unit 240 of FIG. 6.

A reconstructed block is generated using the prediction block and the residual block (S340).

The prediction block has the same size of the prediction unit, and the residual block has the same size of the transform unit. Therefore, the residual signals and the prediction signals of same size are added to generate reconstructed signals.

Figure 8:
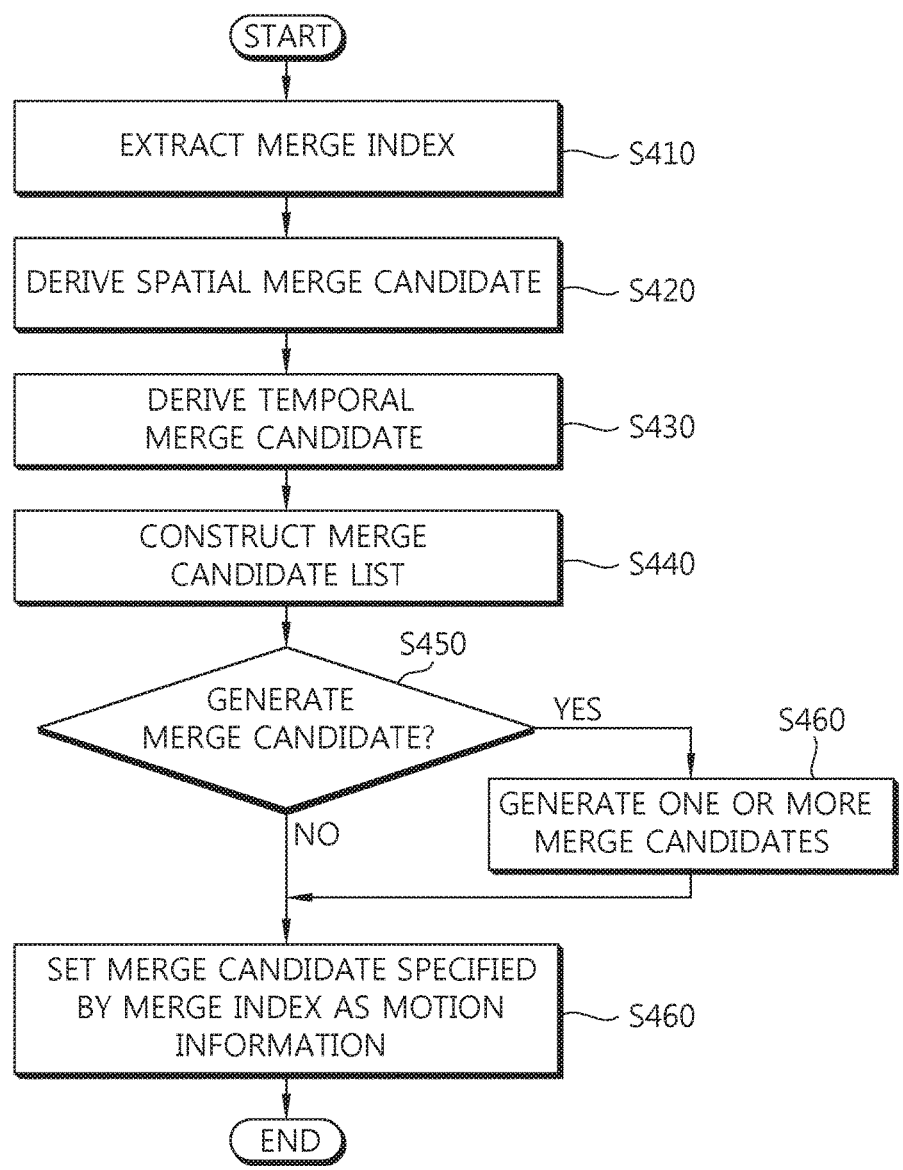
FIG. 8 is a flow chart illustrating a method of deriving motion information in merge mode.

FIG. 8 is a flow chart illustrating a method of deriving motion information in merge mode.

A merge index is extracted from a bit stream (S410). If the merge index does not exist, the number of merge candidates is set to one.

Spatial merge candidates are derived (S420). The spatial merge candidates are the same as describe in S210 of FIG. 3.

A temporal merge candidate is derived (S430). The temporal merge candidate includes a reference picture index and a motion vector of the temporal merge candidate. The reference index and the motion vector of the temporal merge candidate are the same as described in S220 of FIG.3.

A merge candidate list is constructed (S440). The merge list is the same as described in S230 of FIG. 3.

It is determined whether one or more merge candidates are generated or not (S450). The determination is performed by comparing the number of merge candidates listed in the merge candidate list with a predetermined number of the merge candidates. The predetermined number may be determined per picture or slice.

If the number of merge candidates listed in the merge candidate list is smaller than a predetermined number of the merge candidates, one or more merge candidates are generated (S460). The generated merge candidate is listed after the last available merge candidate. The merge candidate is generated as the same method described in S250 of FIG. 3.

The merge candidate specified by the merge index is set as the motion information of the current block (S470).

Figure 9:
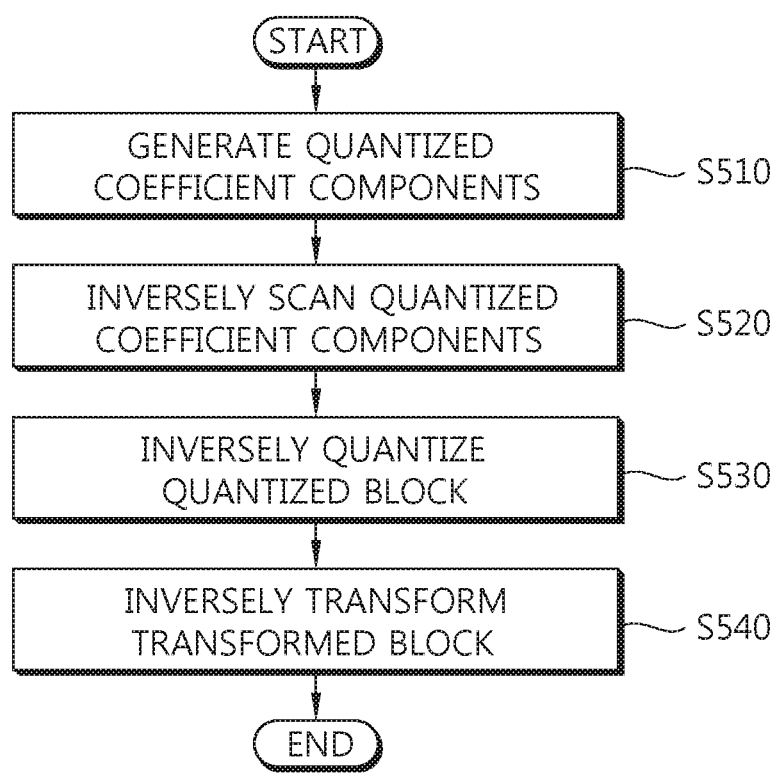
FIG. 9 is a flow chart illustrating a procedure of generating a residual block in inter prediction mode according to an embodiment of the present invention.

FIG. 9 is a flow chart illustrating a procedure of generating a residual block in inter prediction mode according to the present invention.

Quantized coefficient components are generated by the entropy decoding unit (S510).

A quantized block is generated by inversely scanning the quantized coefficient components according to the diagonal scan (S520). The quantized coefficient components include the significant flags, the coefficient signs and the coefficients levels.

When the size of the transform unit is larger than a predetermined size, the significant flags, the coefficient signs and the coefficients levels are inversely scanned in the unit of subset using the diagonal scan to generate subsets, and the subsets are inversely scanned using the diagonal scan to generate the quantized block. The predetermined size is equal to the size of the subset. The subset is a 4×4 block including 16 transform coefficients. The significant flags, the coefficient signs and the coefficient levels are inversely scanned in the reverse direction. The subsets are also inversely scanned in the reverse direction.

The parameter indicating last non-zero coefficient position and the non-zero subset flags are extracted from the bit stream. The number of encoded subsets is determined based on the parameter indicating last non-zero coefficient position. The non-zero subset flag is used to determine whether the corresponding subset has at least one non-zero coefficient. If the non-zero subset flag is equal to 1, the subset is generated using the diagonal scan. The first subset and the last subset are generated using the inverse scan pattern.

The quantized block is inversely quantized using an inverse quantization matrix and a quantization parameter (S530).

Figure 10:
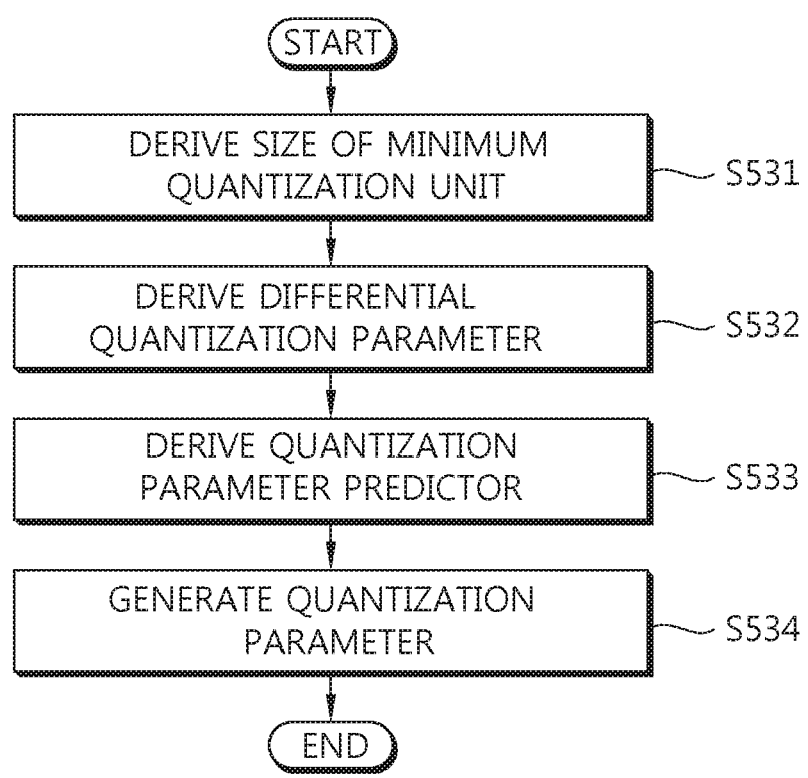
FIG. 10 is a flow chart illustrating a method of deriving a quantization parameter according to an embodiment of the present invention.

FIG. 10 is a flow chart illustrating a method of deriving a quantization parameter according to the present invention.

A minimum size of quantization unit is derived (S531). A parameter (cu_qp_delta_enabled_info) specifying the minimum size is extracted from a bit stream, and the minimum size of the quantization unit is determined by the following equation.

$$Log2(MinQUSize)=Log2(MaxCUSize)-cu\_qp\_delta\_enabled\_info$$

The MinQUSize indicates the minimum size of the quantization unit, the MaxCUSize indicates the size of LCU. The parameter cu_qp_delta_enabled_info is extracted from a picture parameter set. The size of the quantization unit is equal to one of allowable sizes of the coding unit.

A differential quantization parameter of the current coding unit is derived (S532). The differential quantization parameter is included per quantization unit. Therefore, if the size of the current coding unit is equal to or larger than the minimum size, the differential quantization parameter is restored for the current coding unit. If the differential quantization parameter does not exist, the differential quantization parameter is set to zero. If multiple coding units belong to the quantization unit of the minimum size, the first coding unit containing at least one non-zero coefficient in the decoding order contains the differential quantization parameter.

A coded differential quantization parameter is arithmetically decoded to generate bin string indicating the absolute value of the differential quantization parameter and a bin indicating the sign of the differential quantization parameter. The bin string may be a truncated unary code. If the absolute value of the differential quantization parameter is zero, the bin indicating the sign does not exist. The differential quantization parameter is derived using the bin string indicating the absolute value and the bin indicating the sign.

A quantization parameter predictor of the current coding unit is derived (S533). The quantization parameter predictor is generated by using quantization parameters of neighboring coding units and quantization parameter of previous coding unit as follows.

A left quantization parameter, an above quantization parameter and a previous quantization parameter are sequentially retrieved in this order. An average of the first two available quantization parameters retrieved in that order is set as the quantization parameter predictor when two or more quantization parameters are available, and when only one quantization parameter is available, the available quantization parameter is set as the quantization parameter predictor. That is, if the left and above quantization parameter are available, the average of the left and above quantization parameter is set as the quantization parameter predictor. If only one of the left and above quantization parameter is available, the average of the available quantization parameter and the previous quantization parameter is set as the quantization parameter predictor. If both of the left and above quantization parameter are unavailable, the previous quantization parameter is set as the quantization parameter predictor.

If multiple coding units belong to a quantization unit of minimum size, the quantization parameter predictor for the first coding unit in decoding order is derived and used for the other coding units.

The quantization parameter of the current coding unit is generated using the differential quantization parameter and the quantization parameter predictor (S534).

A residual block is generated by inverse-transforming the inverse-quantized block (S540). One dimensional horizontal and vertical inverse DCT based-transforms are used.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for decoding video data in a merge mode, the apparatus comprising:
   an inter prediction unit, implemented by at least one processor, and configured to derive motion information of a current coding unit and generate a prediction block using the motion information,
   wherein the motion information is derived by using a merge index and a merge candidate list constructed by using available spatial merge candidates and an available temporal merge candidate;
   an inverse-quantizing unit, implemented by at least one processor, and configured to inverse-quantize a quantized block by using a quantization parameter;
   an inverse transform unit, implemented by at least one processor, and configured to generate a residual block by inverse-transforming the inverse-quantized block; and
   an adder, implemented by at least one processor, and configured to generate a reconstruct block by adding the residual block and the prediction block,
   wherein the quantization parameter is generated by using a quantization parameter predictor and a differential quantization parameter per a quantization unit, and a minimum size of the quantization unit is specified per a picture,
   wherein the quantization parameter generated per the quantization unit is shared with coding units in the quantization unit,
   wherein, when both of a left quantization parameter which is a quantization parameter of a left coding unit of the current coding unit, and an above quantization parameter which is a quantization parameter of an above coding unit of the current coding unit, are available, the quantization parameter predictor is generated by averaging the left quantization parameter and the above quantization parameter,
   wherein, when only one of the left quantization parameter and the above quantization parameter is available, the quantization parameter predictor is derived by averaging a previous quantization parameter and the available quantization parameter among the left quantization parameter and the above quantization parameter,
   wherein the previous quantization parameter is a quantization parameter of a previous coding unit of the current coding unit in decoding order,
   wherein, when none of the above quantization parameter and the left quantization parameter is available, the previous quantization parameter is set as the quantization parameter predictor, and
   wherein a motion vector of the temporal merge candidate is a motion vector of a temporal merge candidate block in a temporal merge candidate picture which is one of a first candidate block and a second candidate block, and a reference picture index of the temporal merge candidate is set to zero.

2. The apparatus of claim 1, wherein the spatial merge candidates include motion information of a merge candidate block, and available blocks of a left block, an above block, an above-right block and a left-below block are set as available merge candidate blocks.

3. The apparatus of claim 2, wherein an available above-left block is set as the merge candidate block when at least one of the left block, the above block, the above-right block, and the left-below block is unavailable.

4. The apparatus of claim 1, wherein the differential quantization parameter is generated by restoring a bin string indicating an absolute value of the differential quantization parameter and a bin indicating a sign of the differential quantization parameter.

5. The apparatus of claim 1, wherein the first candidate block is a block in the temporal merge candidate picture corresponding to a right-below corner block of a current block, and the second candidate block is a block in the temporal merge candidate picture corresponding to a block including a left-above pixel of the current block.

6. The apparatus of claim 5, wherein the first candidate block is set as the temporal merge candidate block when the first candidate block is available, and the second candidate block is set as the temporal merge candidate block when the first candidate block is not available and the second candidate block is available.

* * * * *